(12) United States Patent
Wang et al.

(10) Patent No.: US 11,775,316 B2
(45) Date of Patent: Oct. 3, 2023

(54) REQUEST PROCESSING METHOD, SYSTEM ON CHIP, AND PUBLIC CLOUD MANAGEMENT COMPONENT

(71) Applicant: HUAWEI TECHNOLOGIES CO., LTD., Shenzhen (CN)

(72) Inventors: Junjie Wang, Hangzhou (CN); Yijian Dong, Shenzhen (CN); Haitao Guo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 374 days.

(21) Appl. No.: 16/743,131

(22) Filed: Jan. 15, 2020

(65) Prior Publication Data

US 2020/0150977 A1 May 14, 2020

Related U.S. Application Data

(63) Continuation of application No. PCT/CN2018/088829, filed on May 29, 2018.

(30) Foreign Application Priority Data

Sep. 5, 2017 (CN) .......................... 201710791704.9

(51) Int. Cl.
*G06F 9/4401* (2018.01)
*G06F 9/455* (2018.01)
(Continued)

(52) U.S. Cl.
CPC .......... *G06F 9/4416* (2013.01); *G06F 9/4406* (2013.01); *G06F 9/45541* (2013.01); *G06F 9/45558* (2013.01); *H04L 67/06* (2013.01); *H04L 67/1097* (2013.01); *G06F 2009/45595* (2013.01)

(58) Field of Classification Search
CPC ................. G06F 9/4416; G06F 9/4406; G06F 9/45541; G06F 9/45558; H04L 67/06; H04L 67/1097
See application file for complete search history.

(56) References Cited

U.S. PATENT DOCUMENTS 6,694,317 B1 2/2004 Stakutis et al.
6,751,658 B1 6/2004 Haun et al.
(Continued)

FOREIGN PATENT DOCUMENTS

| CN | 101344852 A | 1/2009 |
|---|---|---|
| CN | 101661398 A | 3/2010 |

(Continued)

*Primary Examiner* — Tammara R Peyton
(74) *Attorney, Agent, or Firm* — Maier & Maier, PLLC (57) ABSTRACT

A method is implemented by a system on chip and includes: receiving a volume attaching request sent by the public cloud management component, where the volume attaching request includes an identifier of a system volume; and storing the identifier of the system volume based on the volume attaching request, where when the bare-metal server is started, the bare-metal server uses the identifier of the system volume to determine the system volume, and starts an operating system of the bare-metal server based on the system volume, and the system volume stores a file used for starting the operating system of the bare-metal server.

20 Claims, 6 Drawing Sheets

(51) Int. Cl.
*H04L 67/06* (2022.01)
*H04L 67/1097* (2022.01)

(56) References Cited

U.S. PATENT DOCUMENTS

| | | |
|---|---|---|
| 7,293,168 B2 | 11/2007 | Maeda et al. |
| 9,110,600 B1 | 8/2015 | Brooker et al. |
| 9,940,377 B1 | 4/2018 | Sait |
| 10,911,405 B1 | 2/2021 | Harland et al. |
| 2005/0093572 A1 | 5/2005 | Sun et al. |
| 2010/0058042 A1 | 3/2010 | Locker et al. |
| 2010/0250630 A1 | 9/2010 | Kudo |
| 2011/0055536 A1 | 3/2011 | Banga et al. |
| 2012/0054734 A1 | 3/2012 | Andrews et al. |
| 2012/0185913 A1 | 7/2012 | Martinez et al. |
| 2013/0111034 A1 | 5/2013 | Upadhya |
| 2014/0089652 A1* | 3/2014 | Gerri ............ H04L 41/085 713/2 |
| 2015/0113532 A1* | 4/2015 | Huang ............ G06F 9/45558 718/1 |
| 2015/0120669 A1 | 4/2015 | Ibanescu |
| 2015/0381725 A1 | 12/2015 | Haapaoja et al. |
| 2017/0017524 A1 | 1/2017 | Karaje et al. |
| 2017/0083351 A1 | 3/2017 | Jiang et al. |
| 2018/0060051 A1 | 3/2018 | Ramalingam et al. |
| 2018/0165455 A1 | 6/2018 | Liguori et al. |
| 2020/0409600 A1* | 12/2020 | Liguori ............ G06F 3/0671 |

FOREIGN PATENT DOCUMENTS

| | | |
|---|---|---|
| CN | 102473089 A | 5/2012 |
| CN | 103201721 A | 7/2013 |
| CN | 103297504 A | 9/2013 |
| CN | 104660528 A | 5/2015 |
| CN | 105141684 A | 12/2015 |
| CN | 105335168 A | 2/2016 |
| CN | 105635276 A | 6/2016 |
| CN | 105791370 A | 7/2016 |
| CN | 106104486 A | 11/2016 |
| CN | 106713250 A | 5/2017 |
| CN | 106716334 A | 5/2017 |
| CN | 106796486 A | 5/2017 |
| CN | 107122267 A | 9/2017 |
| WO | 2017/046830 A1 | 3/2017 |

\* cited by examiner

REQUEST PROCESSING METHOD, SYSTEM ON CHIP, AND PUBLIC CLOUD MANAGEMENT COMPONENT

CROSS-REFERENCE TO RELATED APPLICATIONS

This application is a continuation of International Application No. PCT/CN2018/088829, filed on May 29, 2018, which claims priority to Chinese Patent Application No. 201710791704.9, filed on Sep. 5, 2017. The disclosures of the aforementioned applications are hereby incorporated by reference in their entireties.

TECHNICAL FIELD

This application relates to the storage field, and to a request processing method, a system on chip, and a public cloud management component.

BACKGROUND

A preboot execute environment (PXE) is a protocol designed by Intel. The preboot execute environment works in a client/server network mode, and can support a bare-metal server in downloading an operating system from a remote server (another server) by using a network, and accordingly support the bare-metal server in starting the operating system by using the network, so as to provision the bare-metal server.

For example, when a tenant needs to apply for a bare-metal server by using a user interface, a basic input/output system (BIOS) of the bare-metal server invokes a PXE client (a piece of software in the BIOS) into a memory for execution. The PXE client requests a to-be-installed operating system of the bare-metal server from a PXE server (a remote server). The PXE server stores the operating system into the memory of the bare-metal server, and the bare-metal server starts the operating system in the memory, so as to provision the bare-metal server.

However, the process in which the PXE client requests the operating system from the PXE server requires approximately 10 minutes, and the whole procedure is complex and relatively time-consuming. Therefore, the implementation of a fast allocation of a bare-metal server, so as to improve efficiency and user experience becomes a problem that urgently needs to be resolved.

SUMMARY

An exemplary embodiment provides a request processing method, a system on chip, and a public cloud management component, so as to implement fast allocation in a public cloud bare-metal scenario and reduce allocation time of a bare-metal server, thereby improving efficiency and user experience.

According to a first aspect, a request processing method is provided. The method is executed by a system on chip. The system on chip is included in a bare-metal server. The bare-metal server further includes a processor. The bare-metal server is included in a distributed storage system. The distributed storage system further includes a public cloud management component. The method includes: receiving, by the system on chip, a volume attaching request sent by the public cloud management component, where the volume attaching request includes an identifier of a system volume; and storing, by the system on chip, the identifier of the system volume based on the volume attaching request, where when the bare-metal server is started, the bare-metal server uses the identifier of the system volume to determine the system volume, and starts an operating system of the bare-metal server based on the system volume. The system volume stores a file used for starting the operating system of the bare-metal server.

In some possible implementations, the system volume is obtained by the public cloud management component by cloning the file used for the operating system of the bare-metal server.

The request processing method in an embodiment can reduce allocation time of the bare-metal server, thereby improving efficiency and user experience.

With reference to the first aspect, in a first possible implementation of the first aspect, after the bare-metal server starts the operating system of the bare-metal server based on the system volume, the method further includes: receiving, by the system on chip, a volume attaching operation request sent by the public cloud management component, where the volume attaching operation request includes an identifier of a data volume; and sending, by the system on chip, the identifier of the data volume to the processor, to instruct the processor to use the data volume as available storage space of the bare-metal server.

According to the request processing method in this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing automatic volume management.

With reference to the first possible implementation of the first aspect, in a second possible implementation of the first aspect, after the sending, by the system on chip, the identifier of the data volume to the processor, to instruct the processor to use the data volume as available storage space of the bare-metal server, the method further includes: receiving, by the system on chip, a volume detaching operation request sent by the public cloud management component, where the volume detaching operation request includes the identifier of the data volume; and sending, by the system on chip, the identifier of the data volume to the processor, to prohibit the processor from using the data volume as the available storage space of the bare-metal server.

According to the request processing method in this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

According to a second aspect, a request processing method is provided. The method is executed by a public cloud management component. The public cloud management component is included in a distributed storage system. The distributed storage system further includes a bare-metal server. The bare-metal server includes a system on chip. The method includes: generating, by the public cloud management component, a volume attaching request, where the volume attaching request includes an identifier of a system volume, and the system volume stores a file used for starting an operating system of the bare-metal server; and sending, by the public cloud management component, the volume attaching request to the system on chip, to instruct the system on chip to store the identifier of the system volume based on the volume attaching request.

In some possible implementations, the system volume is obtained by the public cloud management component by cloning the file used for the operating system of the bare-metal server.

The request processing method in this embodiment can reduce allocation time of the bare-metal server, thereby improving efficiency and user experience.

With reference to the second aspect, in a first possible implementation of the second aspect, after the bare-metal server starts the operating system of the bare-metal server based on the system volume, the method further includes: generating, by the public cloud management component, a volume attaching operation request, where the volume attaching operation request includes an identifier of a data volume; and sending, by the public cloud management component, the volume attaching operation request to the system on chip, to instruct the system on chip to send the identifier of the data volume to a processor, where the processor uses the data volume as available storage space of the bare-metal server.

According to the request processing method in this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing fully automatic volume management.

With reference to the first possible implementation of the second aspect, in a second possible implementation of the second aspect, after the system on chip sends the identifier of the data volume to the processor, and the processor uses the data volume as the available storage space of the bare-metal server, the method further includes: generating, by the public cloud management component, a volume detaching operation request, where the volume detaching operation request includes the identifier of the data volume; and sending, by the public cloud management component, the volume detaching operation request to the system on chip, to instruct the system on chip to send the identifier of the data volume to the processor, and to prohibit the processor from using the data volume as the available storage space of the bare-metal server.

According to the request processing method in this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

According to a third aspect, a system on chip is provided. The system on chip includes: a transceiver module, configured to receive a volume attaching request sent by a public cloud management component, where the volume attaching request includes an identifier of a system volume; and a processing module, configured to store the identifier of the system volume based on the volume attaching request, where when a bare-metal server is started, the bare-metal server uses the identifier of the system volume to determine the system volume, and starts an operating system of the bare-metal server based on the system volume, and the system volume stores a file used for starting the operating system of the bare-metal server.

In some possible implementations, the system volume is obtained by the public cloud management component by cloning the file used for the operating system of the bare-metal server.

The request processing method in this embodiment can reduce allocation time of the bare-metal server, thereby improving efficiency and user experience.

With reference to the third aspect, in a first possible implementation of the third aspect, the transceiver module is further configured to receive a volume attaching operation request sent by the public cloud management component, where the volume attaching operation request includes an identifier of a data volume; and the transceiver module is further configured to send the identifier of the data volume to a processor of the bare-metal server, to instruct the processor of the bare-metal server to use the data volume as available storage space of the bare-metal server.

According to the system on chip in this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing automatic volume management.

With reference to the first possible implementation of the third aspect, in a second possible implementation of the third aspect, the transceiver module is further configured to receive a volume detaching operation request sent by the public cloud management component, where the volume detaching operation request includes the identifier of the data volume; and the transceiver module is further configured to send the identifier of the data volume to the processor of the bare-metal server, to prohibit the processor of the bare-metal server from using the data volume as the available storage space of the bare-metal server.

According to the system on chip in this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

According to a fourth aspect, a public cloud management component is provided. The public cloud management component includes: a processing module, configured to generate a volume attaching request, where the volume attaching request includes an identifier of a system volume, and the system volume stores a file used for starting an operating system of a bare-metal server; and a transceiver module, configured to send the volume attaching request to a system on chip, to instruct the system on chip to store the identifier of the system volume based on the volume attaching request.

In some possible implementations, the system volume is obtained by the public cloud management component by cloning the file used for the operating system of the bare-metal server.

The request processing method in this embodiment can reduce allocation time of the bare-metal server, thereby improving efficiency and user experience.

With reference to the fourth aspect, in a first possible implementation of the fourth aspect, the processing module is further configured to generate a volume attaching operation request, where the volume attaching operation request includes an identifier of a data volume; and the transceiver module is further configured to send the volume attaching operation request to the system on chip, to instruct the system on chip to send the identifier of the data volume to a processor of the bare-metal server, where the processor of the bare-metal server uses the data volume as available storage space of the bare-metal server.

In this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing automatic volume management.

With reference to the first possible implementation of the fourth aspect, in a second possible implementation of the fourth aspect, the processing module is further configured to generate a volume detaching operation request, where the volume detaching operation request includes the identifier of the data volume; and the transceiver module is further configured to send the volume detaching operation request to the system on chip, to instruct the system on chip to send the identifier of the data volume to the processor of the bare-metal server, and to prohibit the processor of the bare-metal server from using the data volume as the available storage space of the bare-metal server.

In this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

According to a fifth aspect, a system on chip is provided. The system on chip includes: a transceiver, configured to receive a volume attaching request sent by a public cloud management component, where the volume attaching request includes an identifier of a system volume; and a processor, configured to store the identifier of the system volume based on the volume attaching request, where when a bare-metal server is started, the bare-metal server uses the identifier of the system volume to determine the system volume, and starts an operating system of the bare-metal server based on the system volume, and the system volume stores a file used for starting the operating system of the bare-metal server.

With reference to the fifth aspect, in a first possible implementation of the fifth aspect, the transceiver is further configured to receive a volume attaching operation request sent by the public cloud management component, where the volume attaching operation request includes an identifier of a data volume; and the transceiver is further configured to send the identifier of the data volume to a processor of the bare-metal server, to instruct the processor of the bare-metal server to use the data volume as available storage space of the bare-metal server.

With reference to the first possible implementation of the fifth aspect, in a second possible implementation of the fifth aspect, the transceiver is further configured to receive a volume detaching operation request sent by the public cloud management component, where the volume detaching operation request includes the identifier of the data volume; and the transceiver is further configured to send the identifier of the data volume to the processor of the bare-metal server, to prohibit the processor of the bare-metal server from using the data volume as the available storage space of the bare-metal server.

According to a sixth aspect, a public cloud management component is provided. The public cloud management component includes: a processor, configured to generate a volume attaching request, where the volume attaching request includes an identifier of a system volume, and the system volume stores a file used for starting an operating system of a bare-metal server; and a transceiver, configured to send the volume attaching request to a system on chip, to instruct the system on chip to store the identifier of the system volume based on the volume attaching request.

With reference to the sixth aspect, in a first possible implementation of the sixth aspect, the processor is further configured to generate a volume attaching operation request, where the volume attaching operation request includes an identifier of a data volume; and the transceiver is further configured to send the volume attaching operation request to the system on chip, to instruct the system on chip to send the identifier of the data volume to a processor of the bare-metal server, where the processor of the bare-metal server uses the data volume as available storage space of the bare-metal server.

With reference to the first possible implementation of the sixth aspect, in a second possible implementation of the sixth aspect, the processor is further configured to generate a volume detaching operation request, where the volume detaching operation request includes the identifier of the data volume; and the transceiver is further configured to send the volume detaching operation request to the system on chip, to instruct the system on chip to send the identifier of the data volume to the processor of the bare-metal server, and to prohibit the processor of the bare-metal server from using the data volume as the available storage space of the bare-metal server.

According to a seventh aspect, a bare-metal server is provided. The bare-metal server includes a processor and a system on chip. The system on chip is the system on chip in any one of the third aspect, the possible implementations of the third aspect, the fifth aspect, and the possible implementations of the fifth aspect.

According to an eighth aspect, a system is provided. The system includes a bare-metal server and a public cloud management component. The bare-metal server includes a system on chip and a processor. The system on chip is the system on chip in any one of the third aspect, the possible implementations of the third aspect, the fifth aspect, and the possible implementations of the fifth aspect; and/or the public cloud management component is the public cloud management component in any one of the fourth aspect, the possible implementations of the fourth aspect, the sixth aspect, and the possible implementations of the sixth aspect.

DESCRIPTION OF EMBODIMENTS

The following describes technical solutions with reference to accompanying drawings.

The embodiments are applicable to any distributed storage architecture and a non-OpenStack public cloud management architecture.

Figure 1:
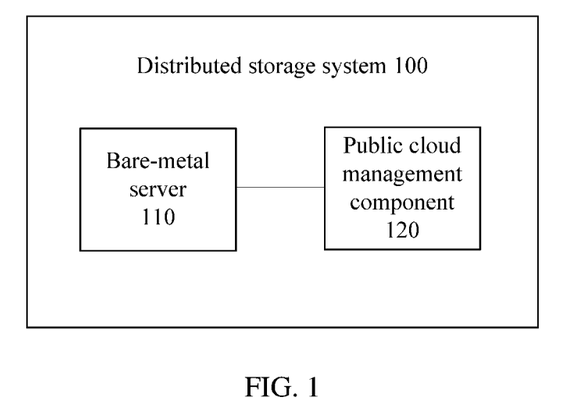
FIG. 1 is a schematic block diagram of a distributed storage system according to an embodiment.

FIG. 1 is a schematic structural diagram of a distributed storage system 100 according to an embodiment. As shown in FIG. 1, the distributed storage system 100 includes a bare-metal server 110 and a public cloud management component 120. The bare-metal server 110 communicates with the public cloud management component 120 by using a network.

Figure 2:
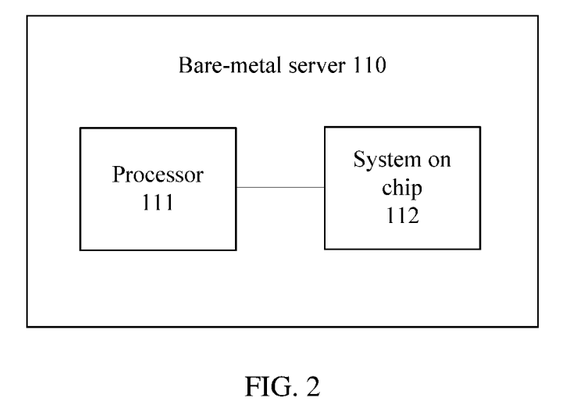
FIG. 2 is a schematic block diagram of a bare-metal server in the distributed storage system shown in FIG. 1.

FIG. 2 is a schematic block diagram of the bare-metal server 110 in the distributed storage system 100 shown in FIG. 1. As shown in FIG. 2, the bare-metal server 110 includes a processor 111 and a system on chip (SOC) 112. The SOC 112 may be embedded in the bare-metal server 110.

It should be understood that, the processor 111 may communicate with the system on chip 112 by using a local Peripheral Component Interconnect Express (PCIe) bus, and the system on chip 112 communicates with the public cloud management component 120 by using a network.

Figure 3:
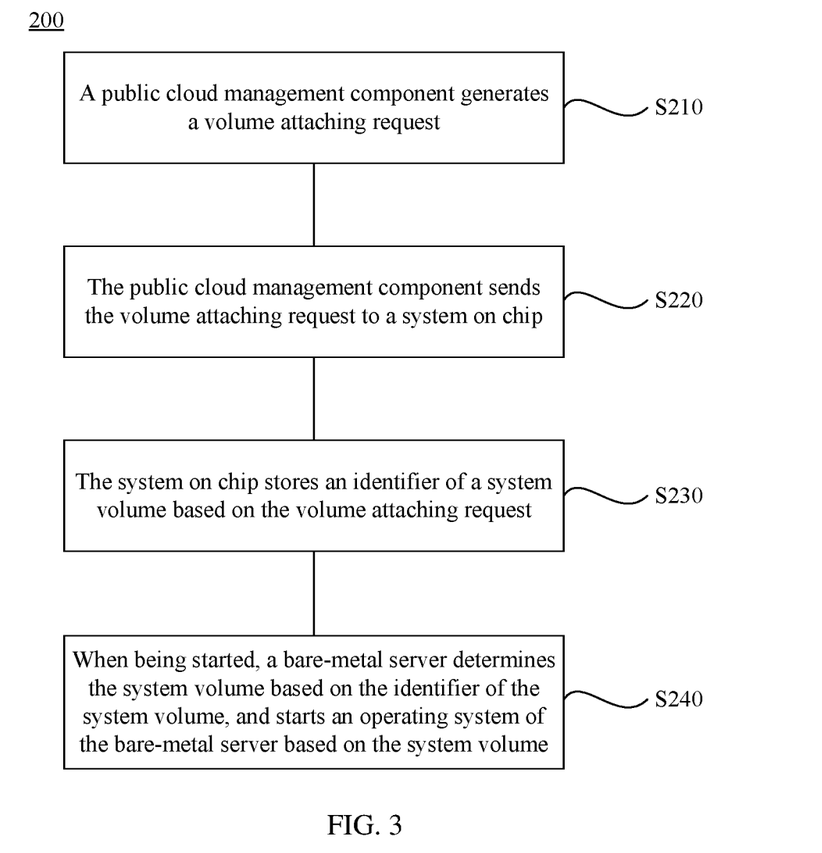
FIG. 3 is a schematic flowchart of a request processing method according to an embodiment.

FIG. 3 is a schematic flowchart of a request processing method 200 according to an embodiment. As shown in FIG. 3, the method 200 includes steps S210 to S240. The method shown in FIG. 3 may be executed by the distributed storage system 100 shown in FIG. 1. Steps S210 and S220 may be executed by the public cloud management component 120 in the distributed storage system 100 shown in FIG. 1. Step S230 may be executed by the system on chip 112 in the distributed storage system 100 shown in FIG. 1. Step S240 may be executed by the bare-metal server 110 in the distributed storage system 100 shown in FIG. 1.

In step S210, the public cloud management component 120 generates a volume attaching request, where the volume attaching request includes an identifier of a system volume, and the system volume stores a file used for starting an operating system of the bare-metal server 110.

It should be understood that, the bare-metal server 110 includes a processor 111 and the system on chip 112. Although the system on chip 112 is a component of the bare-metal server 110, the operating system of the bare-metal server 110 is not an operating system of the system on chip 112. For example, the bare-metal server 110 may include a central processing unit and a memory coupled to the central processing unit. The operating system of the bare-metal server 110 may be stored in the memory. The central processing unit may run the operating system of the bare-metal server 110 by accessing the memory.

In step S220, the public cloud management component 120 sends the volume attaching request to the system on chip 112.

In step S230, the system on chip 112 stores the identifier of the system volume based on the volume attaching request.

It should be understood that, the system on chip 112 attaches the system volume to the operating system of the system on chip 112 based on the volume attaching request, that is, one volume is added to the operating system of the system on chip 112. For example, a user may view, on a graphical user interface (GUI) of the operating system of the system on chip 112, that the system volume is added to the operating system of the system on chip 112. For example, the system volume may be a drive "C" of the system on chip 112. The operating system of the system on chip 112 may access the system volume.

In step S240, when being started, the bare-metal server 110 determines the system volume based on the identifier of the system volume and starts the operating system of the bare-metal server 110 based on the system volume.

For example, when the bare-metal server 110 starts the operating system of the bare-metal server 110 based on the system volume, the bare-metal server 110 runs the file, stored in the system volume, used for starting the operating system of the bare-metal server, to start the operating system of the bare-metal server 110.

For example, the operating system of the system on chip 112 may be Windows or Linux.

It should be understood that, when the bare-metal server 110 starts the bare-metal server 110 based on the system volume in step S240, the bare-metal server 110 adds one system volume. For example, the system volume may be a drive "C" of the bare-metal server 110.

Figure 4:
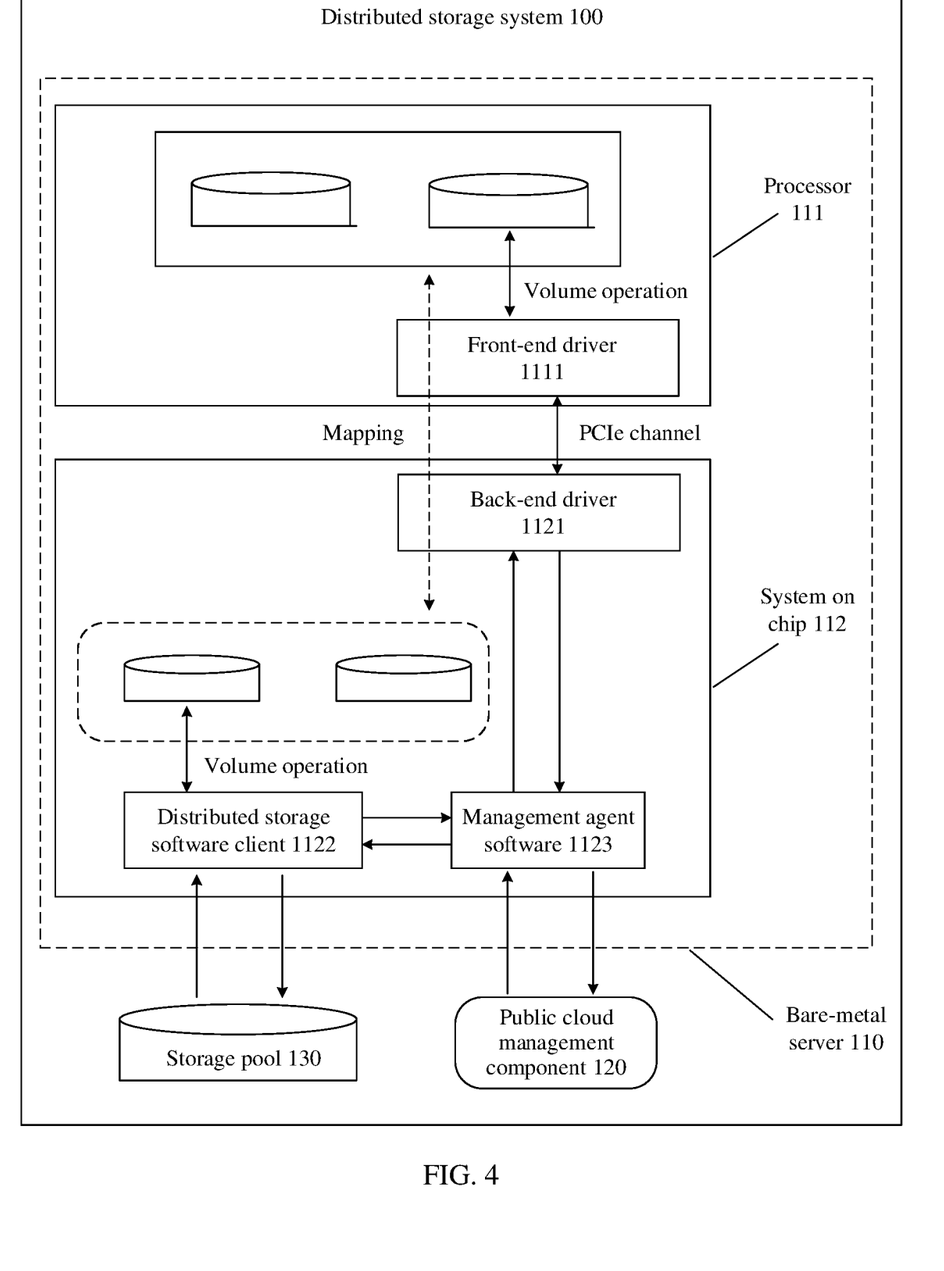
FIG. 4 is another schematic block diagram of a distributed storage system according to an embodiment.

Optionally, FIG. 4 is another schematic structural diagram of a distributed storage system 100 according to an embodiment. The distributed storage system 100 shown in FIG. 1 may be extended to obtain the distributed storage system 100 shown in FIG. 4. As shown in FIG. 4, the distributed storage system further includes a storage pool 130. The system volume is obtained by a public cloud management component 120 by cloning a file used for an operating system of a bare-metal server 110. Before cloning the file used for the operating system, the public cloud management component 120 may obtain the file used for the operating system from the storage pool 130.

Optionally, a processor 111 of the bare-metal server 110 stores a front-end driver 1111, and a system on chip 112 stores a back-end driver 1121, a distributed storage software client 1122, and a management agent software 1123. For example, when a tenant needing to apply for the bare-metal server 110 applies for the bare-metal server 110 by using a local client interface that is used by the tenant, the public cloud management component 120 generates a volume attaching request based on a request sent by the local client that is used by the tenant. The volume attaching request includes an identifier of a system volume. The public cloud management component 120 sends the volume attaching request to the system on chip 112. The system on chip 112 determines, by using the management agent software 1123, that the volume attaching request needs to be processed by the distributed storage software client 1122. The distributed storage software client 1122 attaches the system volume to an operating system of the system on chip 112 based on the volume attaching request. For example, the system on chip 112 stores a correspondence between the identifier of the system volume and information about the system volume by using the distributed storage software client 1122. The information about the system volume is used for starting the bare-metal server 110. When the bare-metal server 110 is started, the processor 111 of the bare-metal server 110 uses the correspondence to obtain the information about the system volume based on the identifier of the system volume; accesses, based on the information about the system volume, a file for the operating system of the bare-metal server 110 stored in the system volume; and starts the operating system of the bare-metal server 110 based on the system volume.

It should be understood that the correspondence is stored in a mapping table. For example, the mapping table may include an entry in which the information about the system volume and the identifier of the system volume are recorded. The information about the system volume may include a size of the system volume and a logical block address (LBA) of the system volume. The identifier of the system volume includes a storage address or a universally unique identifier (UUID) of the system volume.

It should be further understood that, identifiers of all volumes created by the public cloud management component are different, and the identifier of the system volume is a unique identifier.

When the bare-metal server 110 is started, the processor 111 first obtains the identifier of the system volume from the system on chip 112, and the processor 111 determines the information about the system volume based on the identifier of the system volume. The processor 111 uses the identifier of the system volume as a search key word, to search the mapping table for an entry matching the identifier of the system volume. The processor 111 determines the information about the system volume based on the matched entry, and the processor 111 starts the file used for the operating system of the bare-metal server 110 based on the information about the system volume. In an exemplary embodiment, the bare-metal server 110 uses the system volume as the operating system of the bare-metal server 110 and runs the system volume.

For example, when the bare-metal server 110 is started, the processor 111 loads a BIOS to find the system on chip 112. The system on chip 112 runs a drive program of the system on chip 112 that is stored in an expansion read-only memory (Expansion ROM) of the system on chip 112, to obtain an identifier of a system volume. The system on chip 112 sends the identifier of the system volume to the processor 111 of the bare-metal server 110. The processor 111 of the bare-metal server 110 sends a volume query command to the system on chip 112 based on the identifier of the system volume. The volume query command carries the identifier of the system volume. After receiving the volume query command, the system on chip 112 parses the volume query command to search for the mapping table stored in the system on chip 112. The mapping table stores a mapping relationship between the identifier of the system volume and information about the system volume. The information about the system volume includes an LBA of the system volume. The system on chip 112 sends the LBA in the information about the system volume to the processor 111. The processor 111 may run a boot loader. The processor may use the boot loader to access the system volume indicated by the LBA. The processor may use the boot loader to obtain, from the system volume, a file used for starting the operating system of the bare-metal server. The processor runs the file used for starting the operating system of the bare-metal server, to start the operating system of the bare-metal server. For example, the operating system of the bare-metal server may be Windows 9x, and the file used for starting the operating system of the bare-metal server may be IO.SYS. For example, the operating system of the bare-metal server may be MS-DOS, and the file used for starting the operating system of the bare-metal server may be MSDOS.SYS.

It should be understood that, after the processor 111 obtains the LBA, the system volume is visible to the bare-metal server 110.

According to the technical solution, it may be understood that the information about the system volume is stored in the system on chip 112. The system on chip 112 is a component of the bare-metal server 110. Therefore, the bare-metal server 110 may obtain information about the operating system of the bare-metal server 110 based on the correspondence, pre-stored in the system on chip 112, between the identifier of the system volume and the information about the system volume, and run the operating system based on the system volume. In the technical solution, instead of downloading, when a server is started, an image from a remote server by starting a PXE client, the server obtains, based on only the information about the system volume, the file for starting the operating system of the bare-metal server 110, and further the operating system of the bare-metal server 110 is started based on the system volume. This reduces time for which the bare-metal server 110 first starts the PXE client, downloads the image from the remote server, and then starts the installed operating system, thereby improving efficiency and user experience.

It should be further understood that, when a tenant needs to release the bare-metal server 110, the tenant only needs to attach the system volume to the public cloud management component 120, the bare-metal server may be used by another tenant, and the public cloud management component 120 removes the system volume securely.

The request processing method in this embodiment implements fast allocation and reclaim of the bare-metal server and reduces time from 10 minutes to second-level time, thereby improving efficiency and user experience.

Figure 5:
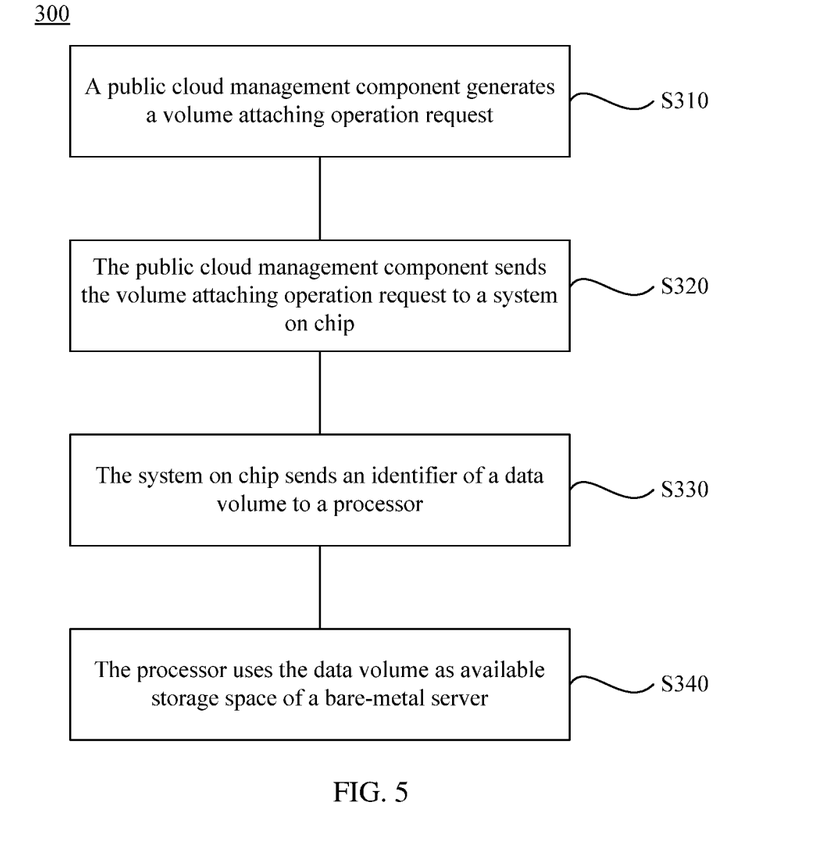
FIG. 5 is another schematic flowchart of a request processing method according to an embodiment.

FIG. 5 is a schematic flowchart of a request processing method 300 according to an embodiment. As shown in FIG. 5, the method 300 includes steps S310 to S340. The method shown in FIG. 5 may be executed by the distributed storage system 100 shown in FIG. 1. For example, an entity for executing the method shown in FIG. 5 and an entity for executing the method shown in FIG. 3 may be the same execution body. Execution time of the method shown in FIG. 5 may be later than execution time of the method shown in FIG. 3.

In step S310, a public cloud management component 120 generates a volume attaching operation request, where the volume attaching operation request includes an identifier of a data volume.

In step S320, after a bare-metal server 110 starts an operating system of the bare-metal server based on a system volume, the public cloud management component 120 sends the volume attaching operation request to a system on chip 112.

In step S330, the system on chip 112 sends the identifier of the data volume to a processor 111 of the bare-metal server 110.

In step S340, the processor 111 of the bare-metal server 110 uses the data volume as available storage space of the bare-metal server 110.

Optionally, before the public cloud management component 120 sends the volume attaching operation request to the system on chip 112, the method 300 further includes:

The public cloud management component 120 finds, based on a correspondence between the bare-metal server 110 and the system on chip 112, a network address corresponding to the system on chip 112.

The public cloud management component 120 sends the volume attaching operation request to a management agent software 1123 of the corresponding system on chip 112. The volume attaching operation request includes the identifier of the data volume. The system on chip 112 determines, by using the management agent software 1123, that the volume attaching operation request needs to be processed by a distributed storage software client 1122. The system on chip 112 attaches, based on the distributed storage software client 1122, the data volume to an operating system of the system on chip 112. The system on chip 112 determines that the identifier of the data volume needs to be sent to the processor 111. The system on chip 112 sends, by using the management agent software 1123, the volume attaching operation request to a back-end driver 1121 stored in the system on chip 112. The system on chip 112 sends, on a PCIe channel based on the back-end driver 1121, the identifier of the data volume to a front-end driver 1111 stored in the processor 111. The processor 111 uses, based on the front-end driver 1111, the data volume as the available storage space of the bare-metal server 110.

It should be understood that, if no front-end driver 1111 exists in the processor 111, the volume attaching operation command is stored in the back-end driver 1121. When loading, the front-end driver 1111 adds all previously attached volumes to the operating system of the bare-metal server 110.

It should be further understood that, the data volume may be an unexpanded volume, or an expanded volume. This is not limited by the embodiments.

It should be further understood that, the processor 111 of the bare-metal server 110 uses the data volume as the available storage space of the bare-metal server 110. The bare-metal server 110 adds the data volume. For example, the data volume may be a drive "D" or a drive "E" of the bare-metal server.

In the prior art, a tenant needs to configure volume information (a volume size and type) by using a management interface (provided by OpenStack management software). The OpenStack management software creates a volume, and feeds back, to the tenant, volume identifier information such as a worldwide name (WWN) or an Internet Small Computer System Interface Qualified Name (IQN) by using a user interface. Then the tenant logs in to the bare-metal server 110 to attach a volume manually. Such a process is relatively difficult and associated with the management interface provided by the OpenStack management software. The request processing method in this embodiment can implement automatic volume management, without manual intervention for a volume operation.

According to the request processing method in this embodiment, the volume attaching operation request generated by the public cloud management component carries an identifier of a volume, so that the bare-metal server automatically attaches the volume. This avoids the requirement that the tenant logs in to the bare-metal server to perform a volume attaching operation manually, thereby implementing automatic volume management.

Figure 6:
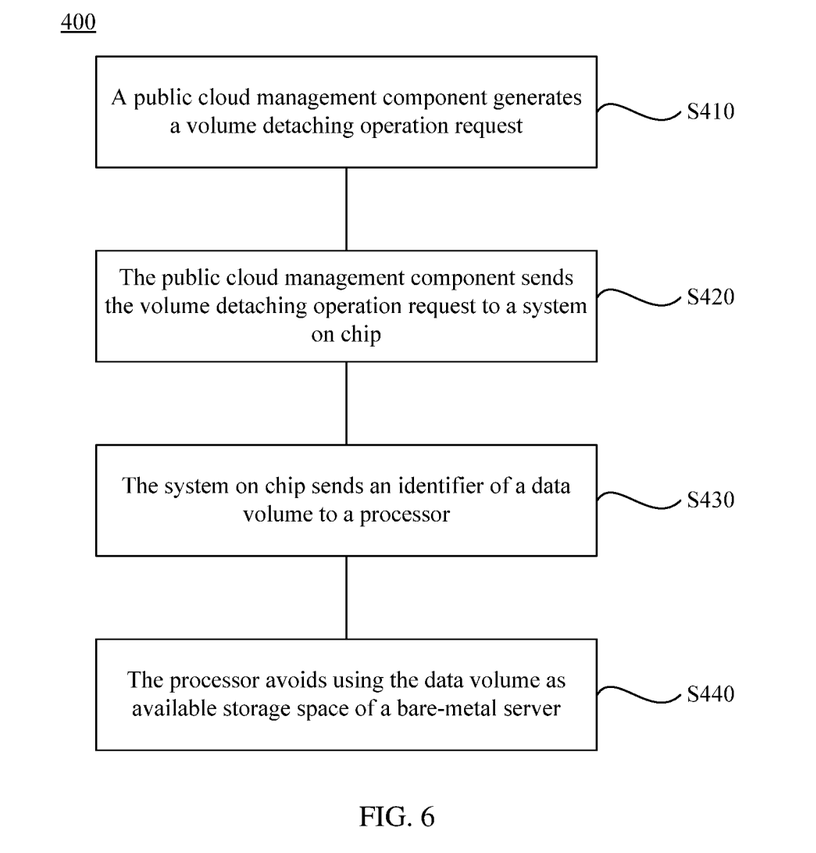
FIG. 6 is still another schematic flowchart of a request processing method according to an embodiment.

FIG. 6 is a schematic flowchart of a request processing method 400 according to an embodiment. As shown in FIG. 6, the method 400 includes steps S410 to S440. The method shown in FIG. 6 may be executed by the distributed storage system 100 shown in FIG. 1. For example, an entity for executing the method shown in FIG. 6 and an entity for executing the method shown in FIG. 5 may be the same execution body. Execution time of the method shown in FIG. 6 may be later than execution time of the method shown in FIG. 5.

In step S410, after a system on chip sends an identifier of a data volume to a processor, to instruct the processor to use the data volume as available storage space of a bare-metal server, a public cloud management component 120 generates a volume detaching operation request, where the volume detaching operation request includes an identifier of the data volume.

In step S420, the public cloud management component 120 sends the volume detaching operation request to a system on chip 112.

In step S430, the system on chip 112 sends the identifier of the data volume to a processor 111.

In step S440, based on the identifier of the data volume, the processor 111 avoids using the data volume as the available storage space of the bare-metal server 110.

It should be understood that, the volume detaching operation request may be generated after the volume attaching operation request in the method 300 is generated. A processing procedure is similar to the method 300. A difference lies in that, after obtaining the identifier of the data volume, the processor 111 avoids using the data volume as the available storage space of the bare-metal server 110.

It should be understood that, before step S440, the processor 111 may use the data volume as the available storage space of the bare-metal server 110. For example, the processor 111 of the bare-metal server 110 may use the data volume as the available storage space of the bare-metal server 110 based on step S340.

For example, based on step S340, one volume is added to an operating system of the bare-metal server 110. For example, a user of the bare-metal server 110 may view, on a GUI of the operating system of the bare-metal server 110, that the data volume is added to the operating system of the bare-metal server 110. For example, the data volume may be a drive D or a drive E of the bare-metal server 110. The operating system of the bare-metal server 110 may access the data volume.

For example, based on step S440, one volume is deleted from the operating system of the bare-metal server 110. For example, the user of the bare-metal server 110 may view, on the GUI of the operating system of the bare-metal server 110, that the data volume is deleted from the operating system of the bare-metal server 110. After the data volume is deleted, the user cannot access the data volume by using the operating system of the bare-metal server 110.

According to the request processing method in this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

With reference to FIG. 1 to FIG. 6, the foregoing details the request processing methods according to the embodiments. With reference to FIG. 7 to FIG. 10, the following details a system on chip and a public cloud management component according to embodiments. It should be noted that, the system on chip and the public cloud management component shown in FIG. 7 to FIG. 10 may be configured to implement the system on chip 112 shown in FIG. 2 and the public cloud management component 120 shown in FIG. 1, respectively. The system on chip and the public cloud management component shown in FIG. 7 to FIG. 10 may be configured to execute the methods shown in FIG. 3, FIG. 5, and FIG. 6.

Figure 7:
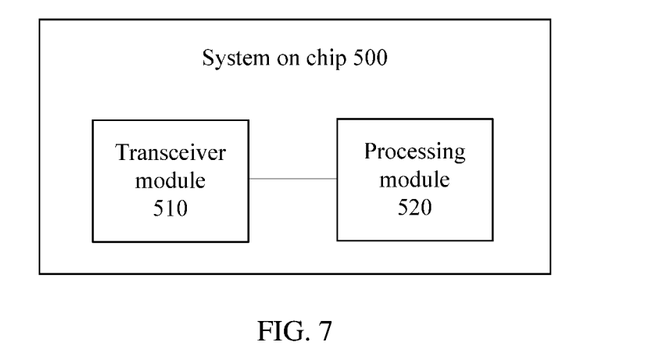
FIG. 7 is a schematic block diagram of a system on chip according to an embodiment.

FIG. 7 is a schematic block diagram of a system on chip 500 according to an embodiment. As shown in FIG. 7, the system on chip 500 includes:

a transceiver module 510, configured to receive a volume attaching request sent by a public cloud management component, where the volume attaching request includes an identifier of a system volume, and the system volume stores a file used for starting an operating system of a bare-metal server; and a processing module 520, configured to store the identifier of the system volume based on the volume attaching request, where when the bare-metal server is started, the bare-metal server uses the identifier of the system volume to determine the system volume, and starts the operating system of the bare-metal server based on the system volume.

The request processing method in the embodiments can reduce allocation time of the bare-metal server, thereby improving efficiency and user experience.

Optionally, the transceiver module 510 is further configured to receive a volume attaching operation request sent by the public cloud management component. The volume attaching operation request includes an identifier of a data volume.

The transceiver module 510 is further configured to send the identifier of the data volume to a processor of the bare-metal server, to instruct the processor of the bare-metal server to use the data volume as available storage space of the bare-metal server.

According to the system on chip in this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing automatic volume management.

Optionally, the transceiver module 510 is further configured to receive a volume detaching operation request sent by the public cloud management component. The volume detaching operation request includes the identifier of the data volume.

The transceiver module 510 is further configured to send the identifier of the data volume to the processor of the bare-metal server, to prohibit the processor of the bare-metal server from using the data volume as the available storage space of the bare-metal server.

According to the system on chip in this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

Figure 8:
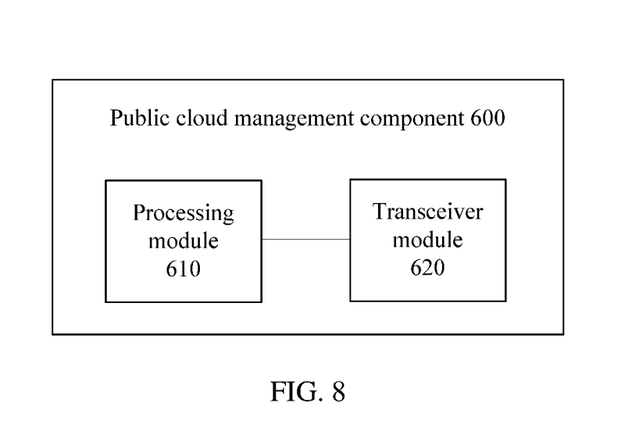
FIG. 8 is a schematic block diagram of a public cloud management component according to an embodiment.

FIG. 8 is a schematic block diagram of a public cloud management component 600 according to an embodiment. As shown in FIG. 8, the public cloud management component 600 includes:

a processing module 610, configured to generate a volume attaching request, where the volume attaching request includes an identifier of a system volume, and the system volume stores a file used for starting an operating system of a bare-metal server; and a transceiver module 620, configured to send the volume attaching request to a system on chip, to instruct the system on chip to store the identifier of the system volume based on the volume attaching request.

In some possible implementations, the system volume is obtained by the public cloud management component by cloning the file used for the operating system of the bare-metal server.

The request processing method in the embodiments can reduce allocation time of the bare-metal server, thereby improving efficiency and user experience.

Optionally, the processing module 610 is further configured to generate a volume attaching operation request. The volume attaching operation request includes an identifier of a data volume.

The transceiver module 620 is further configured to send the volume attaching operation request to the system on chip, to instruct the system on chip to send the identifier of the data volume to a processor of the bare-metal server. The processor of the bare-metal server uses the data volume as available storage space of the bare-metal server.

In this embodiment, the volume attaching operation request generated by the public cloud management component carries an identifier of a volume, so that the bare-metal server automatically attaches the volume. This avoids the requirement that a tenant logs in to the bare-metal server to perform a volume attaching operation manually, thereby implementing automatic volume management.

Optionally, the processing module 610 is further configured to generate a volume detaching operation request. The volume detaching operation request includes the identifier of the data volume.

The transceiver module 620 is further configured to send the volume detaching operation request to the system on chip, to instruct the system on chip to send the identifier of the data volume to the processor of the bare-metal server, and to prohibit the processor of the bare-metal server from using the data volume as the available storage space of the bare-metal server.

In this embodiment, the volume detaching operation request generated by the public cloud management component carries an identifier of a volume, so that the bare-metal server automatically detaches the volume. This avoids the requirement that the tenant logs in to the bare-metal server to perform a volume detaching operation manually, thereby implementing automatic volume management.

Figure 9:
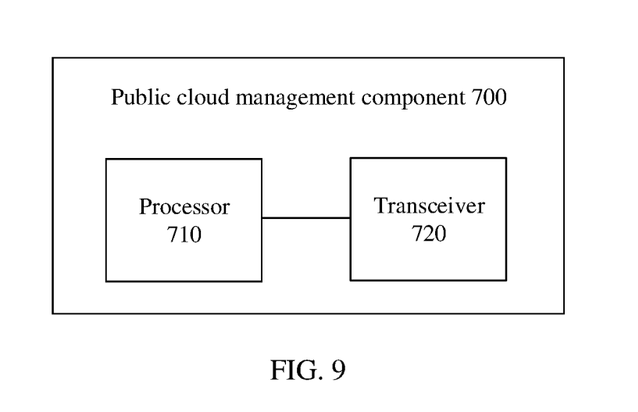
FIG. 9 is another schematic block diagram of a system on chip according to an embodiment.

FIG. 9 is a schematic block diagram of a system on chip 700 according to an embodiment. As shown in FIG. 9, the system on chip 700 includes:

a transceiver 710, configured to receive a volume attaching request sent by a public cloud management component, where the volume attaching request includes an identifier of a system volume, and the system volume stores a file used for starting an operating system of a bare-metal server; and a processor 720, configured to store the identifier of the system volume based on the volume attaching request, where when the bare-metal server is started, the bare-metal server uses the identifier of the system volume to determine the system volume, and starts the operating system of the bare-metal server based on the system volume.

Optionally, the transceiver 710 is further configured to receive a volume attaching operation request sent by the public cloud management component. The volume attaching operation request includes an identifier of a data volume.

The transceiver 710 is further configured to send the identifier of the data volume to a processor of the bare-metal server, to instruct the processor of the bare-metal server to use the data volume as available storage space of the bare-metal server.

Optionally, the transceiver 710 is further configured to receive a volume detaching operation request sent by the public cloud management component. The volume detaching operation request includes the identifier of the data volume.

The transceiver 710 is further configured to send the identifier of the data volume to the processor of the bare-metal server, to prohibit the processor of the bare-metal server from using the data volume as the available storage space of the bare-metal server.

Figure 10:
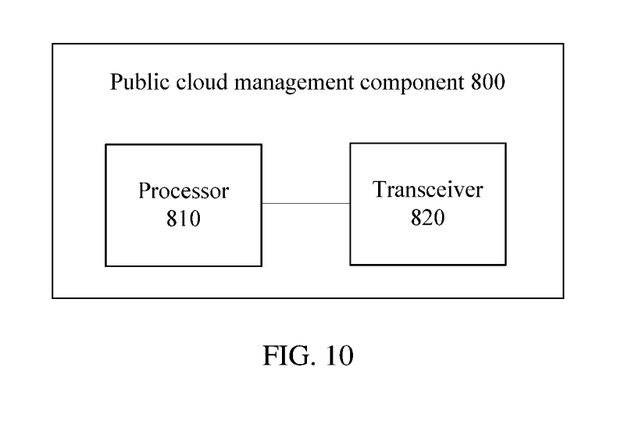
FIG. 10 is another schematic block diagram of a public cloud management component according to an embodiment.

FIG. 10 is a schematic block diagram of a public cloud management component 800 according to an embodiment. As shown in FIG. 10, the public cloud management component 800 includes:

a processor 810, configured to generate a volume attaching request, where the volume attaching request includes an identifier of a system volume, and the system volume stores a file used for starting an operating system of a bare-metal server; and a transceiver 820, configured to send the volume attaching request to a system on chip, to instruct the system on chip to store the identifier of the system volume based on the volume attaching request.

Optionally, the processor 810 is further configured to generate a volume attaching operation request. The volume attaching operation request includes an identifier of a data volume.

The transceiver 820 is further configured to send the volume attaching operation request to the system on chip, to instruct the system on chip to send the identifier of the data volume to a processor of the bare-metal server. The processor of the bare-metal server uses the data volume as available storage space of the bare-metal server.

Optionally, the processor 810 is further configured to generate a volume detaching operation request. The volume detaching operation request includes the identifier of the data volume.

The transceiver 820 is further configured to send the volume detaching operation request to the system on chip, to instruct the system on chip to send the identifier of the data volume to the processor of the bare-metal server, and to prohibit the processor of the bare-metal server from using the data volume as the available storage space of the bare-metal server.

An embodiment further provides a bare-metal server. The bare-metal server includes a processor and a system on chip. The system on chip is either the system on chip 500 or the system on chip 700.

An embodiment further provides a system, including a bare-metal server and a public cloud management component. The bare-metal server includes a processor and a system on chip. The system on chip is either the system on chip 500 or the system on chip 700; and/or the public cloud management component is either the public cloud management component 600 or the public cloud management component 800.

In the embodiments, it should be noted that, the method embodiments in the embodiments may be applied to a processor or is implemented by using a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments. The general purpose processor may be a microprocessor, or the processor may be any conventional processor or the like. Steps of the methods disclosed with reference to the embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information from the memory and completes the steps in the foregoing methods in combination with hardware of the processor.

It may be understood that the memory in the embodiments may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that, the memory of the systems and methods described herein includes but is not limited to these and any memory of another proper type.

It should be understood that "one embodiment" or "an embodiment" does not mean that particular features, structures, or characteristics related to the embodiments are included in at least one embodiment. Therefore, "in one embodiment" or "in an embodiment" does not necessarily refer to a same embodiment. In addition, these particular features, structures, or characteristics may be combined in one or more embodiments in any appropriate manner. It should be understood that, sequence numbers of the foregoing processes do not mean execution sequences in various embodiments. The execution sequences of the processes should be determined according to functions and internal logic of the processes, and should not be construed as any limitation on the implementation processes of the embodiments.

In addition, the terms "system" and "network" may be used interchangeably herein. The term "and/or" describes only an association relationship for describing associated objects and represents that three relationships may exist. For example, A and/or B may represent the following three cases: Only A exists, both A and B exist, and only B exists. In addition, the character "/" generally indicates an "or" relationship between the associated objects.

It should be understood that, in the embodiments, "B corresponding to A" indicates that B is associated with A, and B may be determined according to A. However, it should be further understood that, determining B according to A does not mean that B is determined according to A only; that is, B may also be determined according to A and/or other information.

All or some of the foregoing embodiments may be implemented by using software, hardware, firmware, or any combination thereof. When the software is used to implement the embodiments, the embodiments may be implemented completely or partially in a form of a computer program product. The computer program product may include one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid state disk (SSD)), or the like.

A person of ordinary skill in the art may be aware that, in combination with the examples described in the embodiments disclosed herein, units and algorithm steps may be implemented by electronic hardware or a combination of computer software and electronic hardware. Whether the functions are performed by using hardware or software depends on particular applications and design constraint conditions of the technical solutions. A person skilled in the art can implement the described functions by using different methods for each specific application.

It may be clearly understood by a person skilled in the art that, for ease and brevity of description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented in indirect couplings or communication connections through some interfaces, apparatuses, or units, and may be in electrical, mechanical, or other forms.

The units described as separated parts may or may not be physically separated, and parts displayed as units may or may not be physical units, and may be located in one location or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes any medium that can store program code, such as a removable hard disk, a read-only memory, a random-access memory, a magnetic disk, or an optical disc.

The foregoing description is merely exemplary implementations. Any variation or replacement readily figured out by a person skilled in the art within the technical scope disclosed in this application shall fall within the protection scope of the technical solution.

What is claimed is:

1. A request processing method, executed by a public cloud management component, comprising:
    generating a volume attaching request, wherein the volume attaching request includes an identifier of a system volume, the system volume stores a file used for starting an operating system of a bare-metal server that includes a system on chip having an operating system, and the operating system of the bare-metal server is not the operating system of the system on chip; and
    sending the volume attaching request to a back-end driver stored on the system on chip, to instruct the operating system of the system on chip to store the identifier of the system volume based on the volume attaching request.

2. The method according to claim 1, wherein before generating the volume attaching request, the method further comprises:
    cloning the file used for starting the operating system of the bare-metal server to obtain the system volume.

3. The method according to claim 2, wherein before cloning the system volume, the method further comprises:
    obtaining the file used for starting the operating system of the bare-metal server from a storage pool.

4. The method according to claim 1, further comprising:
    generating the volume attaching request based on a request sent by a local client that is used by a tenant.

5. The method according to claim 1, wherein after starting the operating system of the bare-metal server based on the system volume, the method further comprises:
    generating a volume attaching operation request, wherein the volume attaching operation request includes an identifier of a data volume; and
    sending the volume attaching operation request to the system on chip, to instruct the system on chip to send the identifier of the data volume to a processor, wherein the processor uses the data volume as available storage space of the bare-metal server.

6. The method according to claim 5, wherein after the system on chip sends the identifier of the data volume to the processor, and the processor uses the data volume as the available storage space of the bare-metal server, the method further comprises:
    generating a volume detaching operation request, wherein the volume detaching operation request includes the identifier of the data volume; and sending the volume detaching operation request to the system on chip, to instruct the system on chip to send the identifier of the data volume to the processor, and to prohibit the processor from using the data volume as the available storage space of the bare-metal server.

7. The method according to claim 1, wherein the identifier of the system volume includes a storage address or a universally unique identifier (UUID) of the system volume.

8. A public cloud management component, comprising:
a processor that generates a volume attaching request, wherein the volume attaching request includes an identifier of a system volume, and the system volume stores a file used for starting an operating system of a bare-metal server; and
a transceiver that sends the volume attaching request to a back-end driver stored on a system on chip having an operating system, wherein the operating system of the bare-metal server is not the operating system of the system on chip, to instruct the operating system of the system on chip to store the identifier of the system volume based on the volume attaching request.

9. The public cloud management component according to claim 8, wherein the processor clones the file used for staring the operating system of the bare-metal server to obtain the system volume.

10. The public cloud management component according to claim 8, wherein the processor obtains the file used for starting the operating system of the bare-metal server from a storage pool.

11. The public cloud management component according to claim 8, wherein the processor generates the volume attaching request based on a request sent by a local client that is used by a tenant.

12. The public cloud management component according to claim 8, wherein the processor generates a volume attaching operation request, wherein the volume attaching operation request includes an identifier of a data volume; and the transceiver sends the volume attaching operation request to the system on chip, to instruct the system on chip to send the identifier of the data volume to the processor to use the data volume as available storage space of the bare-metal server.

13. The public cloud management component according to claim 12, wherein the processor generates a volume detaching operation request, wherein the volume detaching operation request includes the identifier of the data volume, and the transceiver sends the volume detaching operation request to the system on chip, to instruct the system on chip to send the identifier of the data volume to the processor of the bare-metal server, and to prohibit the processor of the bare-metal server from using the data volume as the available storage space of the bare-metal server.

14. The public cloud management component according to claim 8, wherein the identifier of the system volume includes a storage address or a universally unique identifier (UUID) of the system volume.

15. A system, comprising:
a bare-metal server and
a public cloud management component, wherein the bare-metal server includes a system on chip and a processor, wherein the system on chip stores an identifier of a system volume based on a volume attaching request, when the bare-metal server is started, the bare-metal server uses the identifier of the system volume to determine the system volume, and starts an operating system of the bare-metal server based on the system volume; and
the public cloud management component generates the volume attaching request including the identifier of the system volume, and the system volume stores a file used for starting the operating system of the bare-metal server, and sends the volume attaching request to a back-end driver stored on the system on chip having an operating system, wherein the operating system of the bare-metal server is not the operating system of the system on chip, to instruct the operating system of the system on chip to store the identifier of the system volume based on the volume attaching request.

16. The system according to claim 15, wherein the system on the chip receives a volume attaching operation request sent by the public cloud management component, wherein the volume attaching operation request includes an identifier of a data volume, and sends the identifier of the data volume to the processor of the bare-metal server, to instruct the processor of the bare-metal server to use the data volume as available storage space of the bare-metal server.

17. The system according to claim 16, wherein the system on the chip receives a volume detaching operation request sent by the public cloud management component, wherein the volume detaching operation request includes the identifier of the data volume, and sends the identifier of the data volume to the processor of the bare-metal server, to prohibit the processor of the bare-metal server from using the data volume as the available storage space of the bare-metal server.

18. The system according to claim 15, wherein the public cloud management component clones the file used for the operating system of the bare-metal server to obtain the system volume.

19. The system according to claim 18, wherein the public cloud management component generates a volume attaching operation request, wherein the volume attaching operation request includes an identifier of a data volume; and sends the volume attaching operation request to the system on chip, to instruct the system on chip to send the identifier of the data volume to the processor of the bare-metal server, wherein the processor of the bare-metal server uses the data volume as available storage space of the bare-metal server.

20. The system according to claim 15, wherein the public cloud management component generates the volume attaching request based on a request sent by a local client that is used by a tenant.

* * * * *